(12) United States Patent
Liu et al.

(10) Patent No.: US 7,694,425 B2
(45) Date of Patent: Apr. 13, 2010

(54) MEASURING DEVICE AND METHOD FOR USING THE SAME

(75) Inventors: Qing Liu, Shenzhen (CN); Jun-Qi Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 154 days.

(21) Appl. No.: 11/966,961

(22) Filed: Dec. 28, 2007

(65) Prior Publication Data

US 2009/0025241 A1   Jan. 29, 2009

(30) Foreign Application Priority Data

Jul. 23, 2007   (CN) .................... 2007 1 0201152

(51) Int. Cl.
*G01B 5/008* (2006.01)
(52) U.S. Cl. .......................... 33/503; 33/1 M

(58) Field of Classification Search ............ 33/556, 33/557, 558, 559, 560, 561, 1 M, 503, 555, 33/573
See application file for complete search history.

(56) References Cited

U.S. PATENT DOCUMENTS

| | | | | | |
|---|---|---|---|---|---|
| 3,916,528 | A | * | 11/1975 | Eisenkopf | 33/706 |
| 4,326,338 | A | * | 4/1982 | Plante | 33/560 |
| 4,466,195 | A | * | 8/1984 | Herzog | 33/503 |
| 4,587,622 | A | * | 5/1986 | Herzog | 33/503 |
| 7,257,902 | B2 | * | 8/2007 | Gao et al. | 33/1 M |
| 2006/0225505 | A1 | * | 10/2006 | Mitsuhashi | 73/514.18 |

FOREIGN PATENT DOCUMENTS

CN   1987350 A     6/2007
JP   61152352 A  *  7/1986

* cited by examiner

*Primary Examiner*—R. A. Smith
(74) *Attorney, Agent, or Firm*—Frank R. Niranjan

(57) ABSTRACT

An exemplary measuring device includes a standard element, a first contour measuring probe, and a controller. The standard element has a first standard plane opposite to a measured object. The first contour measuring probe has a tip extension. The controller is electrically connected to the first contour measuring probe. The tip extension contacts the first standard plane during a measuring process. In addition, a method for using the measuring device is also provided.

15 Claims, 6 Drawing Sheets

MEASURING DEVICE AND METHOD FOR USING THE SAME

CROSS-REFERENCE TO RELATED APPLICATIONS

This application is related to nine co-pending U.S. patent applications, which are: application Ser. No. 11/611,724, filed on Dec. 15, 2006, and entitled "DISTANCE MEASURING PROBE WITH AIR DISCHARGE SYSTEM", application Ser. No. 11/843,664, filed on Aug. 23, 2007, and entitled "CONTOUR MEASURING DEVICE WITH ERROR CORRECTING UNIT", applications Ser. Nos. 11/966,951 and 11/966,952 and both entitled "CONTOUR MEASURING PROBE", applications Ser. Nos. 11/966,957 and 11/966,956 and entitled "CONTOUR MEASURING METHOD FOR MEASURING ASPECTS OF OBJECTS", application Ser. No. 11/966,964, and entitled "MEASURING DEVICE FOR MEASURING ASPECTS OF OBJECTS", application Ser. No. 11/966,959, and entitled "BASE AND CONTOUR MEASURING SYSTEM USING THE SAME", and application Ser. No. 11/966,954, and entitled "CONTOUR MEASURING PROBE FOR MEASURING ASPECTS OF OBJECTS". In Ser. No. 11/611,724, Ser. No. 11/843,664, Ser. No. 11/966,951, Ser. No. 11/966,957, and Ser. No. 11/966,959, the inventors are Qing Liu, Jun-Qi Li, and Takeo Nakagawa. In Ser. No. 11/966,964, Ser. No. 11/966,959, and Ser. No. 11/966,954, the inventors are Qing Liu and Jun-Qi Li. In Ser. No. 11/566,954, the inventors are Jian-bin Kong and Qing Liu. In Ser. No. 11/611,724 and Ser. No. 11/843,664, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD.

BACKGROUND OF THE INVENTION

1. Field of the Invention

The present invention relates to measuring devices and methods for using the same, and particularly to, a measuring device and a method for using the same with a high precision.

2. Discussion of the Related Art

Typically, machine tools are preferred over hand tools because machine tools exhibits high machining precision, can easily be changed into computerized automated systems, and other advantages. Therefore, machine tools are widely used in the manufacturing field. Referring to FIG. 5, a conventional machine tool 10 includes a main body 110, a slidable platform 12, and a controller (not shown). A pair of horizontal guide rails 111 are fixed on the main body 110 and the slidable platform 12 is slidably disposed on the horizontal guide rails 111. Generally, because of manufacturing precision and wear and tear, a gap may be defined between the slidable platform 12 and the horizontal guide rails 111. When the slidable platform 12 slides on the horizontal guide rails 111, the slidable platform 12 may wobble due to the gap, thus the precision of the machining tool 10 decreases. In order to increase the precision of a measuring device, information on the wobble deviation should be taken into account. This wobble deviation information can be used to modify some machining parameters to improve the machining precision of the machine tool 10.

Referring to FIG. 6, a measuring device 20 includes a laser device 201, a collimator 202, a diffraction grating 203, four reflectors 204, two combiners 205, two magnifiers 206, two photoelectric detectors 207, and a processor (not shown). The diffraction grating 203 is fixed on a bottom surface of the slidable platform. The laser device 201 is fixed on the main body opposite to the diffraction grating 203. A laser beam emitted from the laser device 201 enters the diffraction grating 203 and is splitted into four laser beams $Y_1$, $Y_2$, $Z_1$ and $Z_2$. The four laser beams $Y_1$, $Y_2$, $Z_1$ and $Z_2$ are reflected by the corresponding reflectors 204. The laser beams $Y_1$ and $Y_2$ combine with each other to form a laser beam $L_1$, while the laser beams $Z_1$ and $Z_2$ combine with each other to form a laser beam $L_2$. The two laser beams $L_1$ and $L_2$ are magnified by the corresponding magnifiers 206, and enter the corresponding photoelectric detectors 207 in succession. The photoelectric detector 207 transforms an optical signal from the laser beam $L_1$ or $L_2$ to an electric signal, and sends the electric signal to the processor. When the slidable platform wobbles relative to the horizontal guide rails, an intensity and a direction of the laser beams $Y_1$, $Y_2$, $Z_1$ and $Z_2$ are changed. Therefore, an intensity and a direction of the laser beams $L_1$ and $L_2$ are also changed. The deviation from the predetermined path of the slidable platform can be measuring via analyzing the intensity and the direction of the laser beams $L_1$, $L_2$.

However, the diffraction grating 203 is fixed on the bottom surface of the slidable platform, thus the diffraction grating 203 is easy to become loosen from the slidable platform due to the movement of the slidable platform. Further, the diffraction grating 203 is a precision optical element, a tiny change of the position of the diffraction grating 203 should lead to a great measuring error of the measuring device 20.

Therefore, a measuring device and a method for using the same which can overcome the above-described problem are desired.

SUMMARY

In one aspect, an exemplary measuring device includes a standard element, a first contour measuring probe, and a controller. The standard element has a first standard plane opposite to a measured object. The first contour measuring probe has a tip extension. The controller is electrically connected to the first contour measuring probe. The tip extension contacts the first standard plane during a measuring process.

In another aspect, a method for measuring a deviation error of a sliding element sliding on a slide rail extending in a first direction, includes the following steps: providing the measuring device as described in the previous paragraph; fixing the first contour measuring probe on the sliding element, further making the tip extension of the first contour measuring probe extending along a second direction perpendicular to the first direction; positioning the first standard element to make the tip extension of the first contour measuring probe touching with the first standard plane of the standard element; making the tip extension of the first contour measuring probe contacting the first standard plane, when the sliding element sliding on the slide rail; calculating a real movement path along the second direction of the sliding element by the controller via a displacement information along a second direction providing by the first contour measuring probe; comparing the real movement path of the sliding element the with a predetermined movement path stored in the controller to get a deviation error of the sliding element.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present measuring device. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present measuring device and methods for using the same, in detail.

Figure 1:
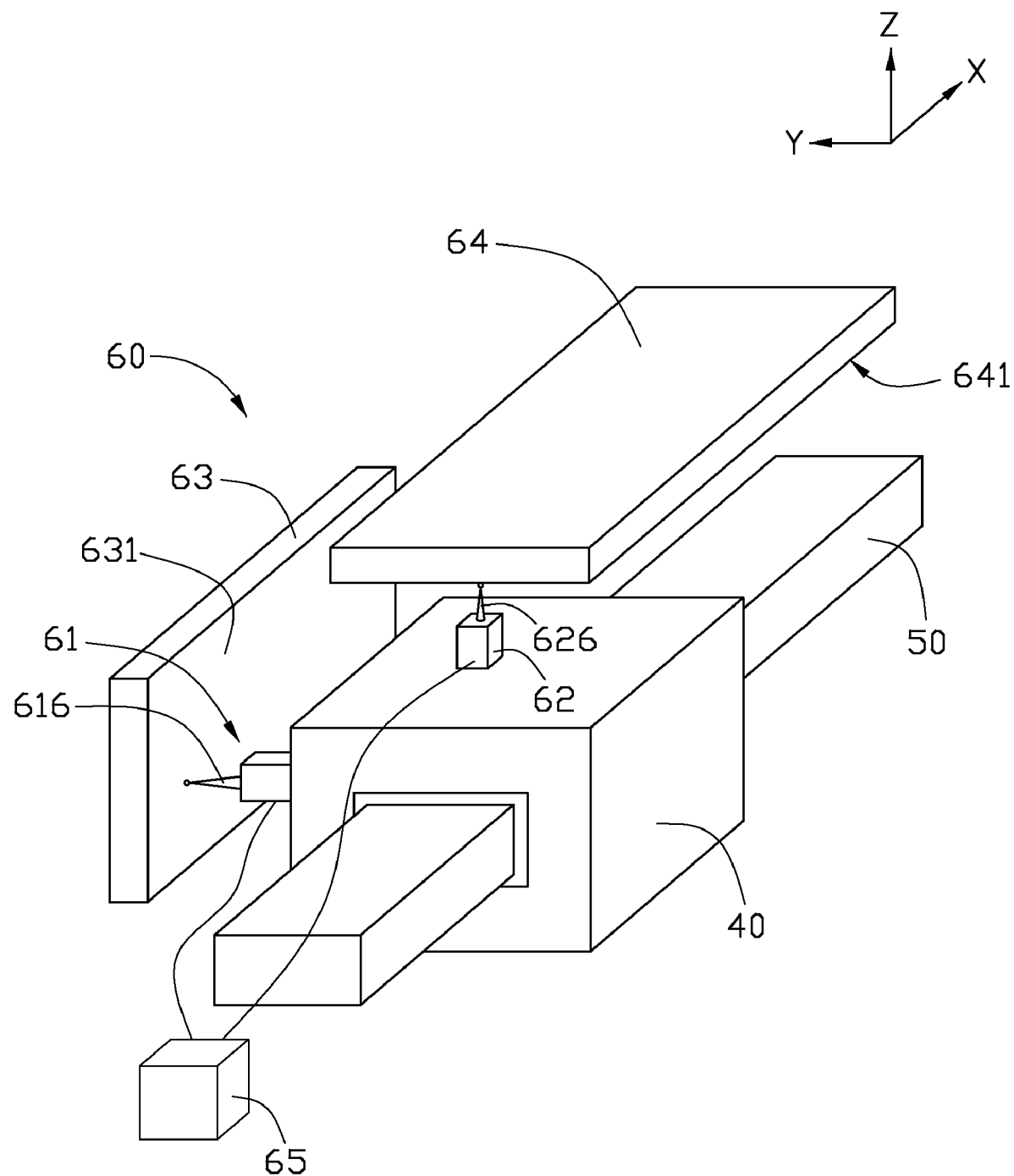
FIG. 1 is an isometric view of a measuring device in accordance with a first preferred embodiment of the present invention measuring a deviation error of a sliding element sliding on a slide rail.

Referring to FIG. 1, a measuring device 60 in accordance with a first preferred embodiment of the present invention is shown. The measuring device 60 is used for measuring a deviation error of a sliding element 40 moving on a slide rail 50. The slide rail 50 extends along a direction parallel to a X-axis. The measuring device 60 includes a first contour measuring probe 61, a second contour measuring probe 62, a first standard plate 63, a second standard plate 64, and a controller 65.

Figure 2:
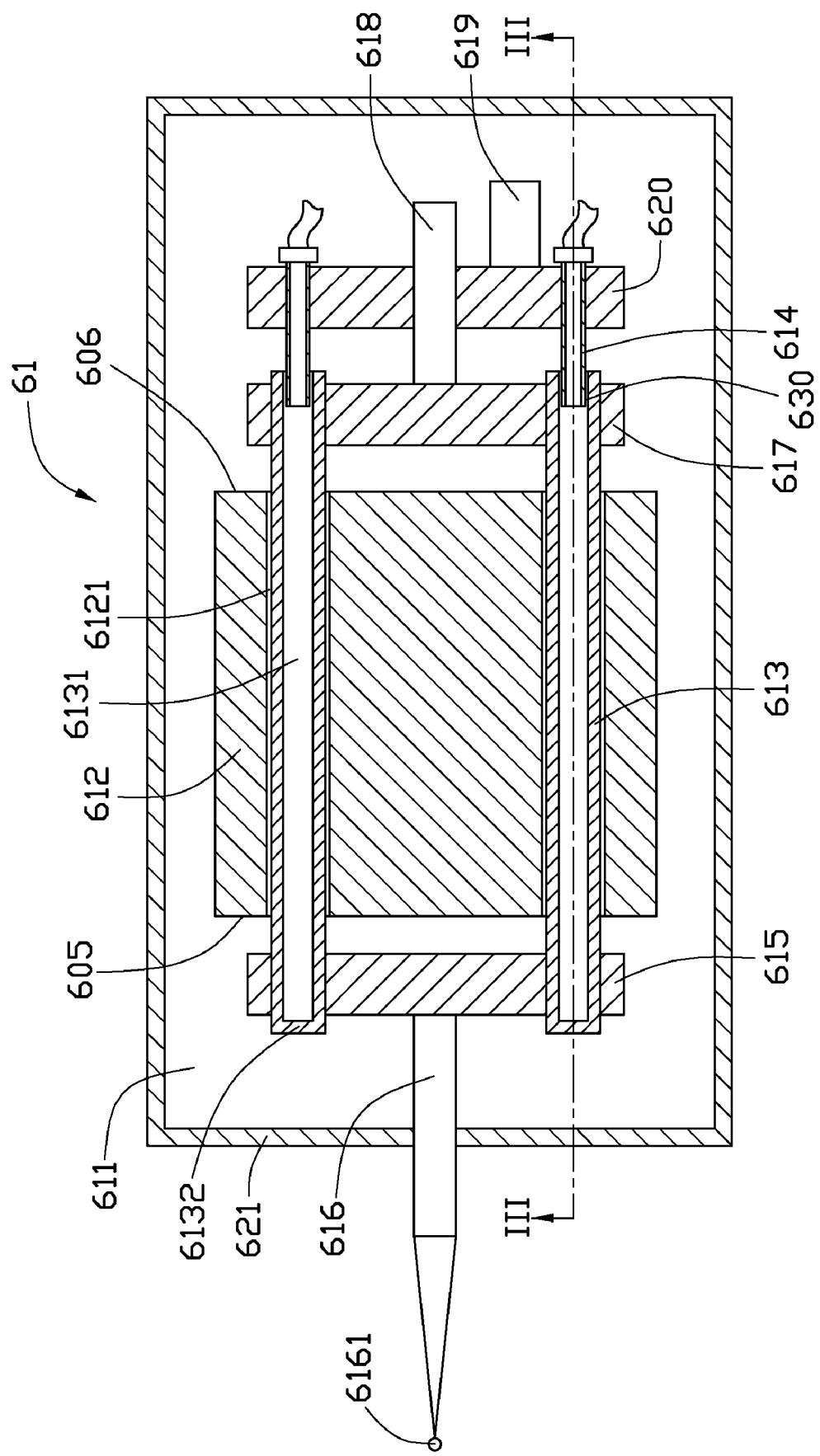
FIG. 2 is a cross-sectional view of a first contour measuring probe of the measuring device of FIG. 1.
Figure 3:
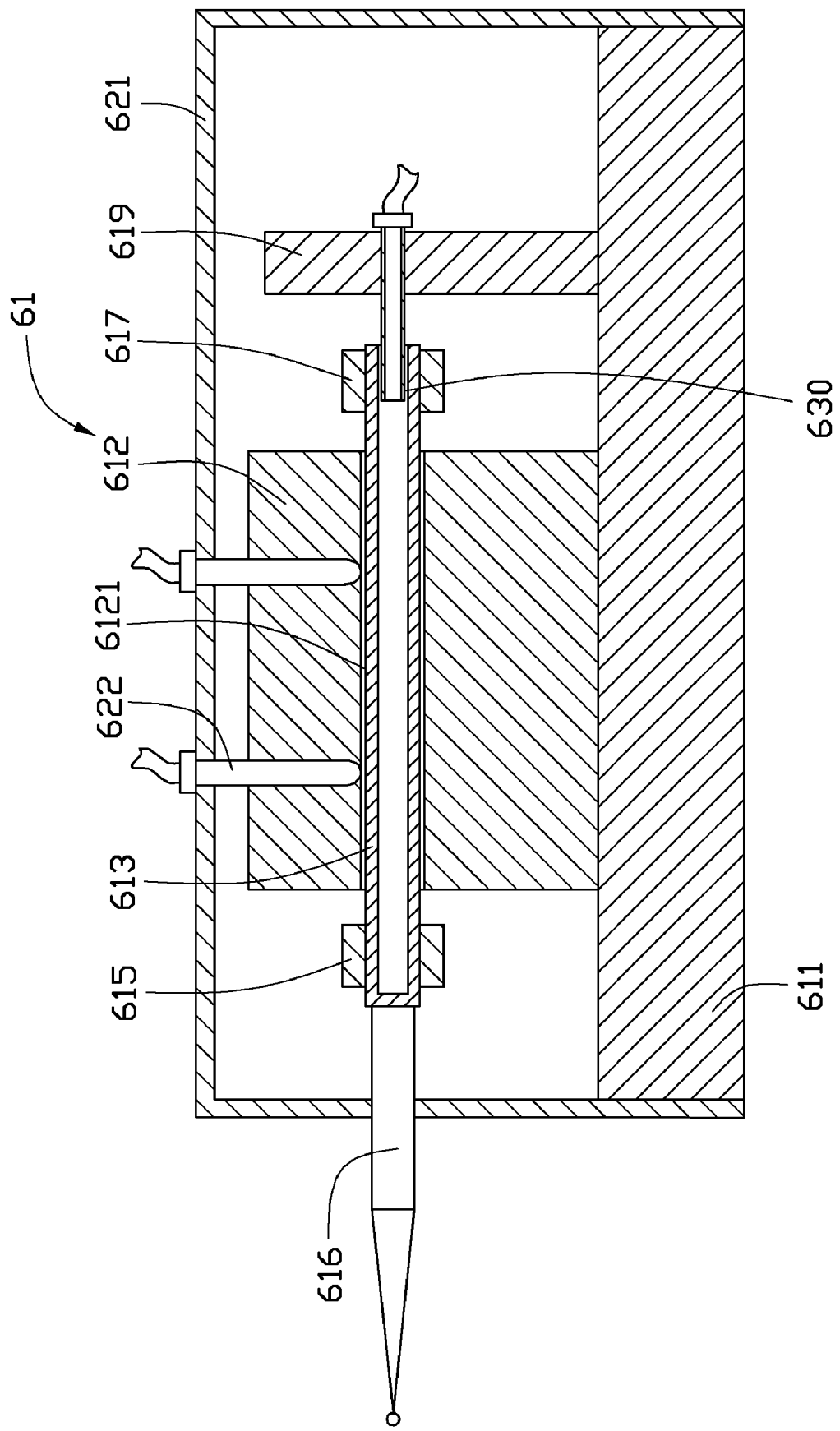
FIG. 3 is a cross-sectional view of the first contour measuring probe of FIG. 2, corresponding to line III-III thereof.

Referring to FIGS. 2 and 3, the first contour measuring probe 61 includes a base 611, a tube track 612, two hollow tubes 613, two pipes 614, a first tube frame 615, a tip extension 616, a second tube frame 617, a linear measuring scale 618, a displacement sensor 619, and a pipe holder 620. In alternative embodiments, the contour measuring probe 61 can include only one hollow tube 613 or more than two hollow tubes 613. In such cases, there can correspondingly be only one pipe 614 or more than two pipes 614. The hollow tubes 613 and the first and second frames 615, 617 collectively form a movable rack (not labeled).

The base 611 is substantially a flat rectangular plate. It should be understood that the base 611 may alternatively have any other suitable shape. The tube track 612 is mounted securely onto the base 611. The tube track 612 has a front end 605 and a rear end 606. The tube track 612 defines two tube rail channels 6121 each extending from the front end 605 to the rear end 606. The tube rail channels 6121 are spaced apart from and aligned parallel to each other. In alternative embodiments, the tube track 612 may define only one tube rail channel 6121 or more than two tube rail channels 6121, corresponding to the number of hollow tubes 613.

Each of the hollow tubes 613 is a cylinder defining a cavity 6131 that extends through the hollow tube 613 from a rear open end of the hollow tube 613 to a front cylinder base 6132 of the hollow tube 613. The hollow tubes 613 are received through the corresponding tube rail channels 6121 of the tube track 612 correspondingly. The rear open ends of the hollow tubes 613 protrude out from the rear end 606 and are fixed onto the second tube frame 617. The front cylinder base 6132 of the hollow tubes 613 protrude out from the front end 605 and are fixed onto the first tube frame 615. In an alternative embodiment, a plurality of air eject holes (not shown) can be defined in the front cylinder base 6132 and a sidewall of each hollow tube 613. An outer diameter of the hollow tubes 613 is configured to be smaller than a diameter of the tube rail channels 6121 so that a gap (not labeled) is defined between the hollow tube 613 and the tube tracks 612 correspondingly. Air is pumped into the gap between the hollow tubes 613 and the tube track 612. Thus, an air bearing is formed between each of the hollow tubes 613 and the tube track 612 when the gaps are filled with air.

Each of the pipes 614 is partially inserted into the open end of a corresponding hollow tube 613. An outer diameter of the pipes 614 is smaller than a diameter of the cavities 6131 of the hollow tubes 613, so that a gap 630 is defined between each pipe 614 and the corresponding hollow tube 613. An air bearing (not labeled) is formed between each pipe 614 and the corresponding hollow tube 613 when air is pumped into the cavities 6131 of the hollow tubes 613 via the pipes 614. Therefore, frictional forces between the hollow tubes 613 and the tube track 612, and between the pipes 614 and the hollow tubes 613, are significantly small. The result is that the hollow tubes 613 can move in the tube rail channels 6121 smoothly.

The pipe holder 620 is fixed on the base 611 behind the second tube frame 617. The pipe holder 620 is configured to hold the pipes 614 in position. When air is pumped into the cavities 6131 of the hollow tubes 613, an air current inside the cavities 6131 creates a pushing force that pushes the hollow tube 613 away from the pipes 614, thereby driving the tip extension 616 away from the second tube frame 617.

The tip extension 616 is needle-shaped, and has a contact tip 6161 that gently touches an object when the contour measuring probe 61 is used for measuring the object. The tip extension 616 is fixed on the first tube frame 615 so that the tip extension 616 is linearly movable together with the movable rack. The linear measuring scale 618 is fixed on the second tube frame 617 such that it moves linearly when the movable rack moves. The displacement sensor 619 is mounted on the base 611 corresponding to the linear measuring scale 618. The displacement sensor 619 is used for reading displacement information from the linear measuring scale 618 and digitally sends displacement values to the controller 65. Since both the tip extension 616 and the displacement sensor 619 are linearly connected to the movable rack correspondingly, the displacement values of the tip extension 616 reflects (is equal to) the displacement values of the linear measuring scale 618. Alternatively, the positions of the linear measuring scale 618 and the displacement sensor 619 may be exchanged.

Referring to FIG. 3, the contour measuring probe 61 further includes a cover 621 that engages on the base 611 and completely seals the various other components of the contour measuring probe 61. The cover 621 defines an opening (not labeled) for allowing a part of the tip extension 616 to extend out the cover 621. Air is pumped into the gaps between the tube track 612 and the hollow tubes 613 to form the air bearing via a plurality of tubes 622 mounted to the cover 621.

The second contour measuring probe 62 has a same structure as the first contour measuring probe 61. The controller 65 is electrically connected to the first contour measuring probe 61 and the second contour measuring probe 62. The first standard plate 63 is a rectangle plate, and has a first standard plane 631. The first standard plane 631 is one side surface of the first standard plate 63 opposite to the sliding element 40. The second standard plate 64 is a rectangle plate, and has a second standard plane 641. The second standard plane 641 is one side surface of the second standard plate 64 opposite to the sliding element 40. Both the first standard plane 631 and the second standard plane 641 have a high surface smoothness.

In a measuring process, the first contour measuring probe 61 is positioned on a first surface of the sliding element 40 and extends in a direction parallel to a Y-axis. The second contour measuring probe 62 is positioned on a second surface perpendicular to the first surface of the sliding element 40 and extends in a direction parallel to a Z-axis. The first standard plate 63 is fixed on the measuring device 60 with the first standard plane 631 facing the sliding element 40. The second standard plate 64 is fixed on the measuring device 60 with the second standard plane 641 facing the sliding element 40. The tip extension 616 of the first contour measuring probe 61 gently pushes against the first standard plane 631 perpendicularly. The tip extension 626 of the first contour measuring probe 62 gently pushes against the second standard plane 641 perpendicularly.

When the sliding element 40 slides on the slide rail 50, the tip extension 616 pushes against, and dragged along the first standard plane 631 of the first standard plate 63, and the tip extension 626 pushes against, and dragged along the second standard plane 641 of the second standard plate 64. If the sliding element 40 moves irregularly while sliding on the slide rail 50, a distance between the sliding element 40 and first standard plane 631 and/or a distance between the sliding element 40 and the second standard plane 641 changes according to a direction of the irregular movements. The displacement sensors of the first and second contour measuring probe 61, 62 read displacement information of the tip extensions 616, 626 and digitally send the displacement information to the controller 65. The controller 65 calculates a real movement path according to the displacement information, and compares the real movement path with the predetermined movement path set in the controller 65 to compute a deviation error of the sliding element 40 on the slide rail 50.

Since the first and second tip extensions 616, 626 of the contour measuring probe 61, 62 contact the first and second standard plane 631, 641 during the measuring process, the measuring process of the measuring device 60 is not affected by an irregular movement of the sliding element 40. Therefore, the distances between the sliding element 40 and the first standard plane 631 (or the second standard plane 641) can be measured with a high precision.

It should be noted that, a measuring device can only include one contour measuring probe, but the measuring device can only calculate a deviation error of the sliding element 40 along the Y-axis or the Z-axis correspondingly. In addition, the tip extension can push against and slant to the standard plane of the standard plate in a measuring process, but an acute angle formed by the tip extension and the standard plane should be not changed in the measuring process.

Figure 4:
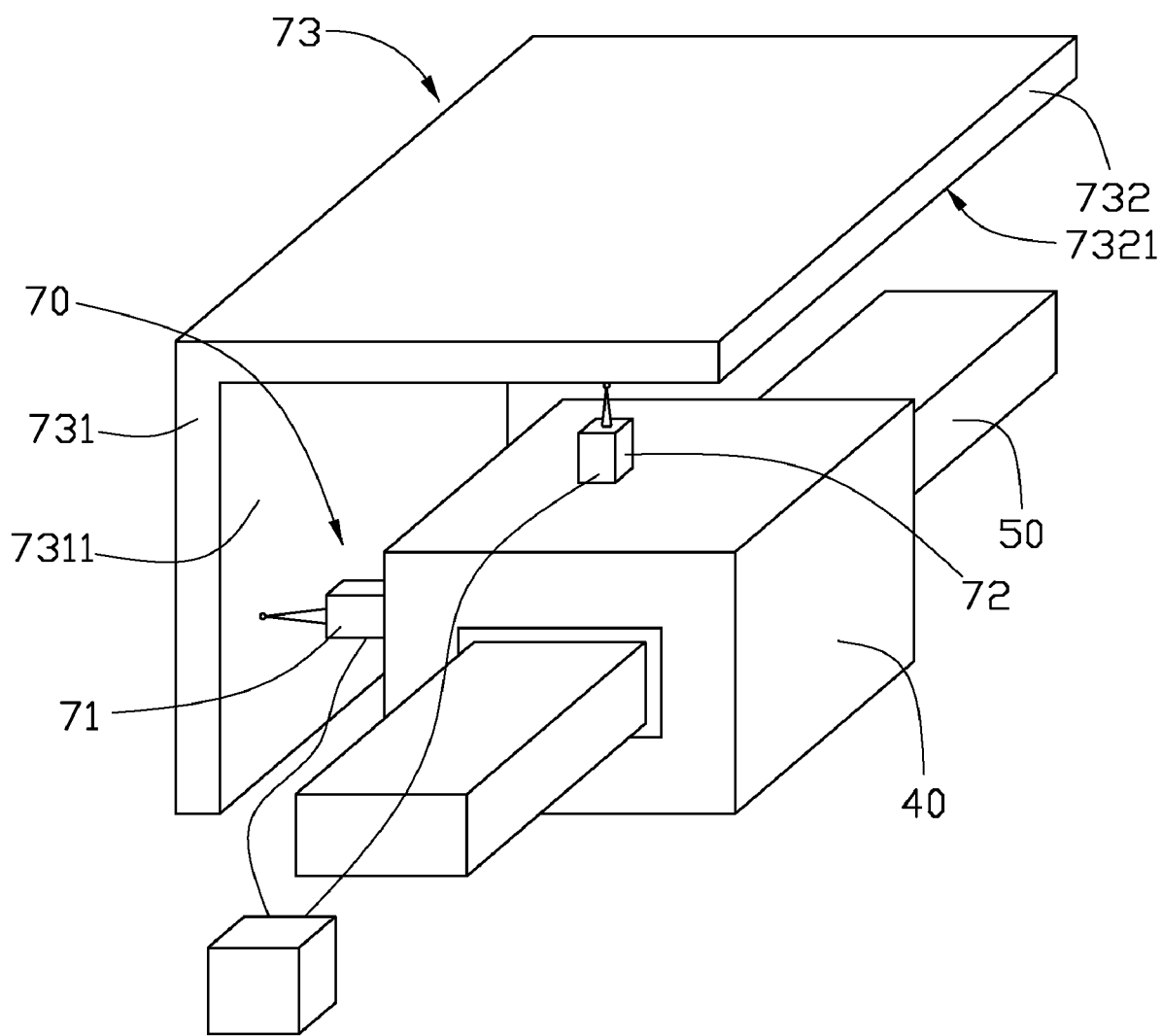
FIG. 4 is an isometric view of a measuring device in accordance with a second preferred embodiment of the present invention measuring a deviation error of a sliding element sliding on a slide rail.
Figure 5:
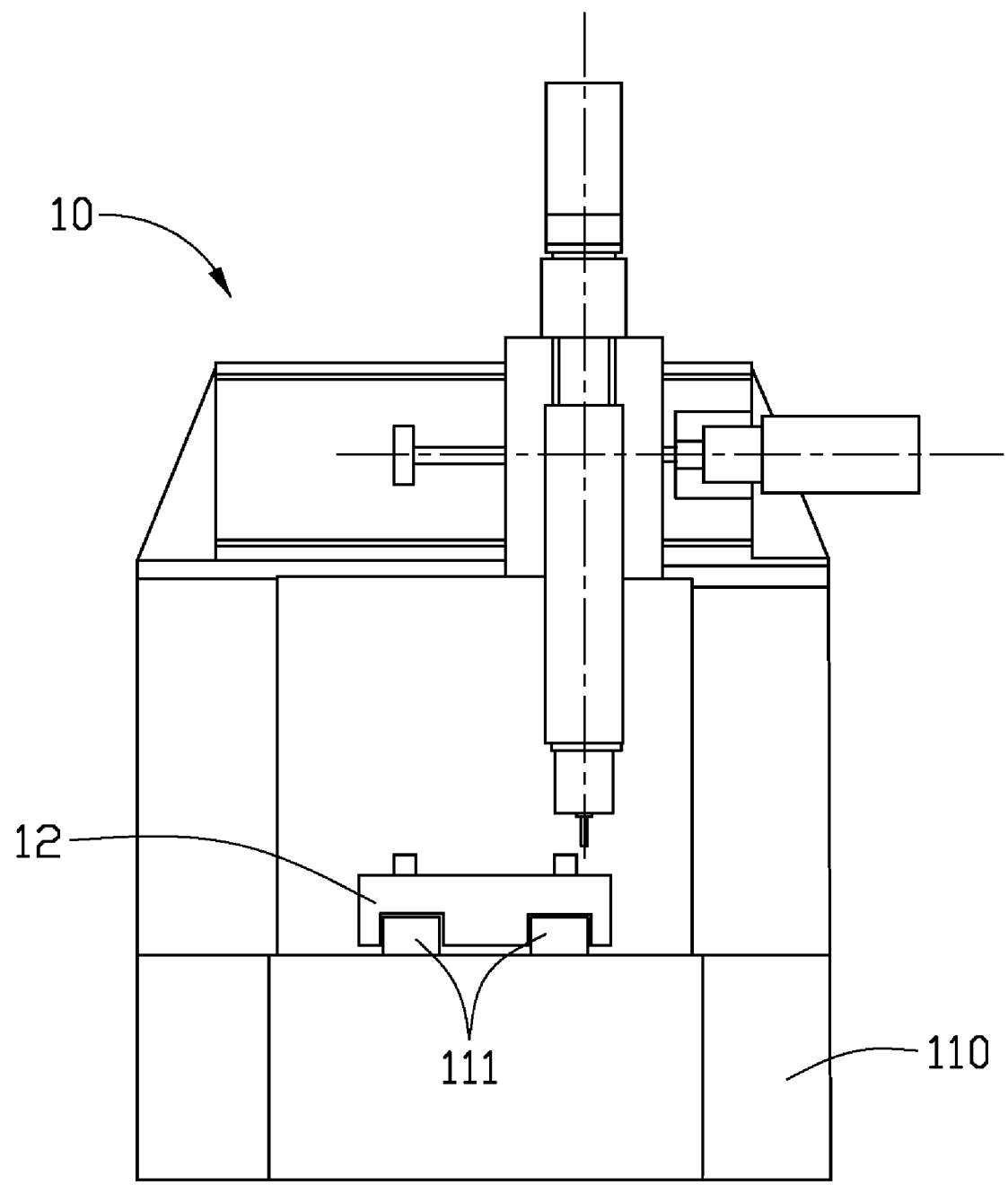
FIG. 5 is a cross-sectional view of a conventional machine tool.
Figure 6:
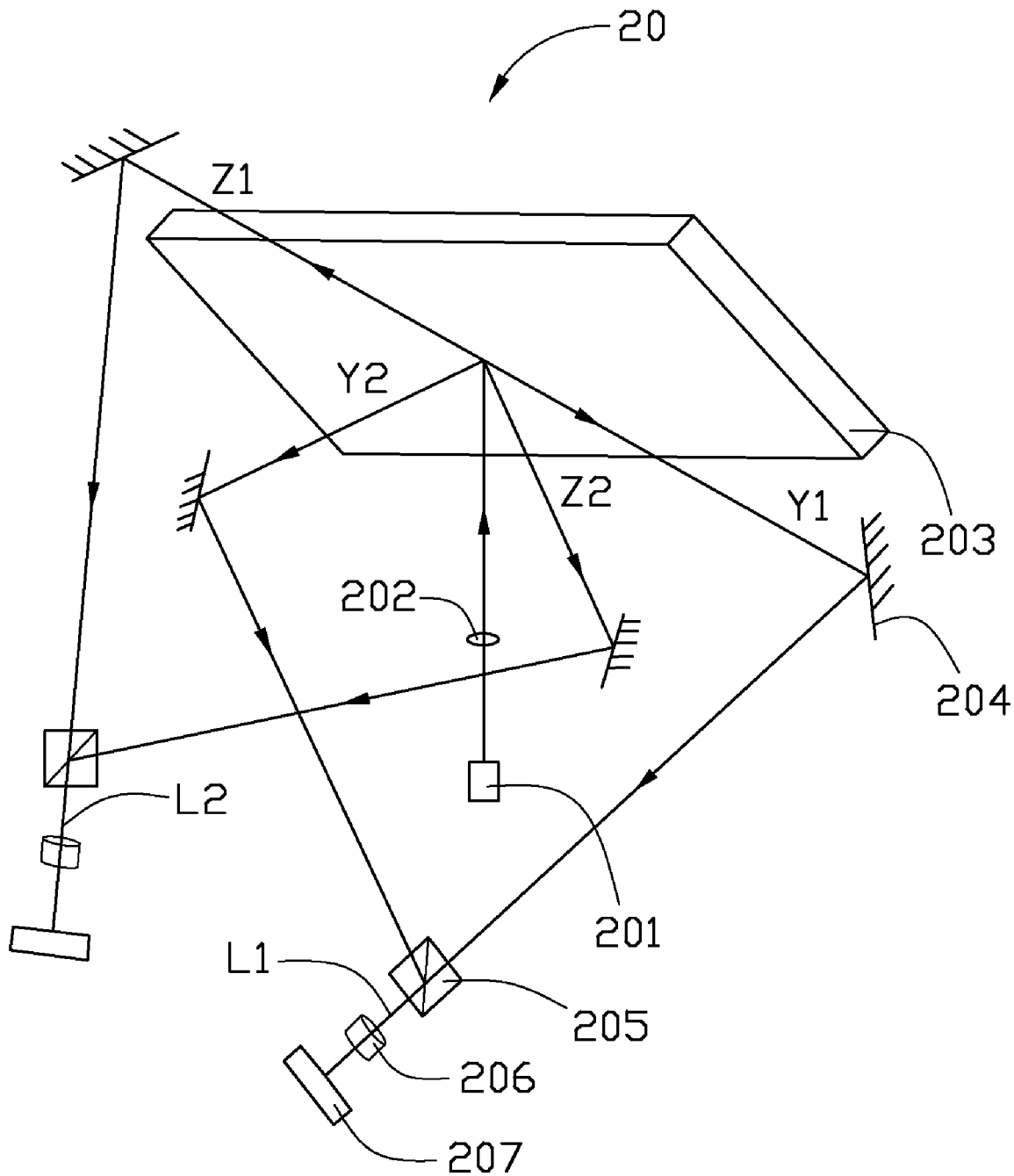
FIG. 6 is an isometric view of a conventional measuring device.

Referring to FIG. 4, a measuring device 70 in accordance with a second preferred embodiment of the present invention is shown. The measuring device 70 is similar in principle to the measuring device 60 of the first preferred embodiment, however a standard element 73 is used instead of the first standard plate 63 and the second standard plate 64. The standard element 73 includes a base 731 and a side plate 732 perpendicularly extending from one side of the base 731. The base 731 has a first standard plane 7311 opposite to the sliding element 40, while the side plate 732 has a second standard plane 7321 perpendicular to the first standard plane 7311. In a measuring process, the first and second measuring probe 71,72 should contact first and second standard plane 7311, 7321 respectively.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A measuring device comprising:
   a standard element having a first standard plane opposite to a measured object, and a second standard plane perpendicular to the first standard plane and opposite to the measured object;
   a first contour measuring probe having a tip extension, the tip extension of the first contour measuring probe contacting the first standard plane during a measuring process;
   a second contour measuring probe having a tip extension, the tip extension of the second contour measuring probe contacting the second standard plane during a measuring process; and
   a controller electrically connected to the first contour measuring probe and the second contour measuring probe.

2. The measuring device as claimed in claim 1, wherein the standard element comprises a first rectangle plate and a second rectangle plate separated from the first rectangle plate; the first standard plane is a side surface of the first rectangle plate opposite to the measured object, the second standard plane is a side surface of the second rectangle plate opposite to the measured object.

3. The measuring device as claimed in claim 1, wherein the standard element comprises a base and a side plate perpendicularly extending from one side of the base; the first standard plane is a side surface of the base opposite to the measured object, the second standard plane is a side surface of the side plate opposite to the measured object.

4. The measuring device as claimed in claim 1, wherein the first contour measuring probe further comprises at least one hollow tube, the tip extension is driven by the at least one hollow tube.

5. The measuring device as claimed in claim 4, wherein the at least one hollow tube defines a cavity for containing compressed air, and is configured to be driven by the compressed air.

6. The measuring device as claimed in claim 5, wherein the first contour measuring probe further comprises at least one pipe, air is pumped in the cavity of the at least one hollow tube via the at least one pipe, the at least one hollow tube comprises an open end and an opposite cylinder base, the at least one pipe is partially received in the cavity of the at least one hollow tube at the open end, a gap is defined between the at least one hollow tube and the at least one pipe so that an air bearing is formed between the at least one hollow tube and the at least one pipe when air is pumped into the cavity of the at least one hollow tube via the at least one pipe.

7. The measuring device as claimed in claim 6, wherein the first contour measuring probe further comprises a linear measuring scale and a displacement sensor, one of the linear measuring scale and the displacement sensor connects to the tip extension and moves following the tip extension.

8. The measuring device as claimed in claim 7, wherein the first contour measuring probe further comprises a first tube frame and a second tube frame, the cylinder base of the hollow tubes and the tip extension are fixed to the first tube frame, the open ends of the hollow tubes and one of the linear measuring scale and the displacement sensor are fixed to the second tube frame.

9. The measuring device as claimed in claim 4, wherein the at least one hollow tube further comprises an air discharge system configured to eject at least some of air in the at least one hollow tube out of the at least one hollow tube.

10. The measuring device as claimed in claim 9, wherein the air discharge system is a combination consisting of any of at least one air eject hole defined in the cylinder base of the at least one hollow tube, and at least one air eject hole defined in a sidewall of at least one hollow tube.

11. A measuring method for measuring a deviation error of a sliding element sliding on a slide rail extending in a first direction, the measuring method comprising:

provided a measuring device, the measuring device comprising:

providing a standard element having a first standard plane opposite to the sliding element, and a second standard plane perpendicular to the first standard plane and opposite to the measured object;

a first contour measuring probe having a tip extension, the tip extension of the first contour measuring probe contacting the first standard plane during a measuring process;

a second contour measuring probe having a tip extension, the tip extension of the second contour measuring probe contacting the second standard plane during a measuring process; and a controller electrically connected to the first contour measuring probe and the second contour measuring probe;

fixing the first contour measuring probe and the second contour measuring probe on the sliding element, further making the tip extension of the first contour measuring probe extend along a second direction perpendicular to the first direction, and the tip extension of the second contour measuring probe extend along a third direction perpendicular to the first direction and the second direction;

positioning the first standard element to make the tip extension of the first contour measuring probe touch the first standard plane of the standard element;

making the tip extension of the first contour measuring probe contact the first standard plane, and the tip extension of the second contour measuring probe contact the second standard plane, when the sliding element sliding on the slide rail;

calculating a real movement path along the second direction of the sliding element by the controller according to a displacement information along a second direction providing by the first contour measuring probe, and a real movement path along the third direction of the sliding element via a displacement information along a third direction provided by the second contour measuring probe;

comparing the real movement paths of the sliding element with predetermined movement paths stored in the controller to get a deviation error of the sliding element.

12. The measuring method as claimed in claim 11, wherein the standard element comprises a first rectangle plate and a second rectangle plate separated from the first rectangle plate; the first standard plane is a side surface of the first rectangle plate opposite to the measured object, the second standard plane is a side surface of the second rectangle plate opposite to the measured object.

13. The measuring method as claimed in claim 11, wherein the standard element comprises a base and a side plate perpendicularly extending from one side of the base; the first standard plane is a side surface of the base opposite to the measured object, the second standard plane is a side surface of the side plate opposite to the measured object.

14. The measuring method as claimed in claim 11, wherein the first contour measuring probe further comprises a linear measuring scale and a displacement sensor, one of the linear measuring scale and the displacement sensor moves following the tip extension of the first contour measuring probe, the displacement sensor reads the displacement information of the tip extension and sends the displacement information along the second direction to the controller.

15. The measuring method as claimed in 11, wherein the second contour measuring probe further comprises a linear measuring scale and a displacement sensor, one of the linear measuring scale and the displacement sensor moves following the tip extension of the second contour measuring probe, the displacement sensor reads the displacement information of the tip extension and sending the displacement information along the third direction to the controller.

* * * * *